United States Patent [19]
Matsuoka et al.

[11] Patent Number: 5,182,920
[45] Date of Patent: Feb. 2, 1993

[54] REFRIGERATION CYCLE SYSTEM

[75] Inventors: Fumio Matsuoka, Kamakura; Kouichi Negoro, Wakayama; Takeshi Sugimoto, Wakayama; Toshiaki Yamaguchi, Wakayama; Tetsuya Yamashita, Wakayama, all of Japan

[73] Assignee: Mitsubishi Denki Kabushiki Kaisha, Tokyo, Japan

[21] Appl. No.: 903,275

[22] Filed: Jun. 24, 1992

[30] Foreign Application Priority Data

Jul. 15, 1991 [JP] Japan .................. 3-173918

[51] Int. Cl.$^5$ .......................................... F25B 41/04
[52] U.S. Cl. ........................................ 62/206; 62/211; 62/217; 62/223
[58] Field of Search ............. 62/206, 217, 204, 205, 62/210, 211, 212, 222, 223, 224, 225

[56] References Cited

U.S. PATENT DOCUMENTS

| | | | |
|---|---|---|---|
| 3,119,559 | 1/1964 | Heidorn | 62/206 X |
| 3,688,516 | 9/1972 | Newton | 62/217 X |
| 3,698,204 | 10/1972 | Schlotterbeck et al. | 62/206 |
| 3,855,836 | 12/1974 | Takahashi et al. | 62/217 |
| 3,899,897 | 8/1975 | Boerger et al. | 62/217 X |
| 3,914,952 | 10/1975 | Barbier | 62/217 X |
| 4,499,739 | 2/1985 | Matsuoka et al. | 62/212 |
| 4,831,836 | 5/1989 | Matsuoka et al. | 62/209 |
| 4,870,834 | 10/1989 | Ogawa et al. | 62/217 X |

FOREIGN PATENT DOCUMENTS

| | | |
|---|---|---|
| 62-182563 | 8/1987 | Japan . |
| 63-155982 | 10/1988 | Japan . |
| 63-290354 | 11/1988 | Japan . |
| 2213653 | 8/1990 | Japan . |

*Primary Examiner*—Harry B. Tanner
*Attorney, Agent, or Firm*—Oblon, Spivak, McClelland, Maier & Neustadt

[57] ABSTRACT

A condenser (2), an electronic expansion valve (5), an evaporator (6), and a motorized suction throttle valve (8) are connected in series with a compressor. When a capacity is increased, the electronic expansion valve (5) is controlled to be in a throttling direction and the motorized suction throttle valve (8) is controlled to be in an unthrottling direction in association with the control of the electronic expansion valve (5), and when a capacity is decreased, the electronic expansion valve (5) is controlled to be in an unthrottling direction and the motorized suction throttle valve (8) is controlled to be in a throttling direction in association with the control of the electronic expansion valve (5). While a capacity control of a compressor by a throttle control is been carried out, such associated control is made between the electronic expansion valve (5) and the motorized suction throttle valve (8), realizing a fine temperature control in a refrigerating machine without hunting.

1 Claim, 2 Drawing Sheets

REFRIGERATION CYCLE SYSTEM

The present invention relates to a refrigeration cycle system which is adapted to be incorporated into e.g. a large scale of prefabricated refrigerator, and in particular to a fine temperature control in the refrigerator.

Referring now to FIG. 3, there is shown a schematic diagram showing a conventional refrigeration cycle system which has been disclosed in e.g. Japanese Unexamined Utility Model Publication No. 155982/1988. In FIG. 3, reference numeral 1 designates a compressor. Reference numeral 2 designates a condenser. Reference numerals 6a and 6b designate evaporators. Reference numeral 7 designates a refrigerator. Reference numeral 9 designates a refrigerator temperature sensor. Reference numeral 11 designates a suction side pipe. Reference numeral 12 designates a pressure sensor which detects a pressure at the suction side pipe 11. Reference numeral 13 designates a controller which makes a frequency control of an inverter 14 based on the pressure detected by the pressure sensor 12. The compressor 1 is driven by the inverter 14. Reference numeral 15 designates a high pressure liquid pipe. Reference numerals 16a and 16b designate temperature sensing bulbs. Reference numerals 17a and 17b designate evaporation expansion valves, opening and closing of which are controlled by the temperature sensing bulbs 16a and 16b. Reference numeral 18a and 18b control devices which control motorized valves 19a and 19b based on a temperature detected by the temperature sensor 9.

An operation of the conventional refrigeration cycle system will be explained. When a pressure value detected by the pressure sensor 12 is below a cut-out value preset in the controller 13 during operation of the refrigeration cycle system, the controller 13 outputs a signal indicative of a decrease in frequency to the inverter 14 to reduce the revolution of the compressor 1. On the other hand, when the pressure value detected by the pressure sensor 12 is above a cut-in value preset in the controller 13, the controller 13 outputs a signal indicative of an increase in frequency to the inverter 14 to raise the revolution of the compressor 1.

The motorized valves 19a and 19b are automatically adjusted by the control devices 18a and 18b to be at the same throttling amount in accordance with a temperature in the refrigerator 7. By such a throttle adjustment of the motorized valves 19a and 19b is controlled a refrigerant circulating amount in the refrigeration cycle. In that manner, the temperatures of the evaporators 6a and 6b are kept at the substantially same level to hardly cause irregularity in the temperature distribution in the refrigerator. For example, when a temperature detected by the temperature sensor 9 is below a temperature set in the control device 18a, the control devices 18a and 18b output signals indicative of a decrease in the throttle setting of the motorized valves 19a and 19b. When the detected temperature is above a temperature set in the control device, the control devices 18a and 18b output signals indicative of an increase in the throttle setting of the motorized valves 19a and 19b.

In addition, opening and closing the evaporation expansion valves 17a and 17b are controlled by the temperature sensing valves 16a and 16b.

Since the conventional system is constructed as stated earlier, the conventional system creates a problem in that there is no correlation between the opening and closing operations of the evaporation expansion valves at the inlet side of the evaporator, and the opening and closing operations of the motorized valves at the outlet side of the evaporator, and that pressure hunting is caused to make a capacity unstable and deteriorate reliability.

It is an object of the present invention to solve the problem, and to provide a fine temperature control for a refrigeration cycle system capable of being controlled in a stable manner without hunting in an evaporation pressure (temperature), and of making a capacity control in a throttling control of a compressor without an inverter.

The foregoing and other objects of the present invention have been attained by providing a refrigeration cycle system comprising a refrigeration cycle having a compressor, a condenser, a solenoid valve, an electronic expansion valve, an evaporator, and a motorized suction throttle valve connected in series therein; and a control unit which when an evaporation load is great, a variable of the setting of the electronic expansion valve is set to be in a throttling direction and a variable of the setting of the motorized suction throttle valve is set to be an unthrottling direction in association with the operation of the electronic expansion valve, and which the evaporation load is small, the variable of the setting of the electronic expansion valve is set to be in an unthrottling direction and the variable of the setting of the motorized suction throttle valve is set to be in a throttling direction in association with the operation of the electronic expansion valve.

In accordance with the present invention, there are three pressure levels in the refrigeration cycle, i.e. a condensation pressure, an evaporation pressure and a suction pressure, which are called a high pressure, a medium pressure and a low pressure. The electric expansion valve at the first step is in charge of a pressure drop between the high pressure and the medium pressure, and the motorized suction throttle valve at the second step is in charge of a pressure drop between the medium pressure and the low pressure. The throttle valves at the first and second steps are controlled in association with each other. As a result, the pressure (the medium pressure) utilized in the evaporator is determined by a relative ratio of the throttle values (i.e. resisters in passage) at the first and second steps to carry out a suitable control of throttling at the second step. As explained, the arrangement according to the present invention wherein a variable of the setting of the electric expansion valve and a variable of the setting of the motorized suction throttle valve are controlled in association with each other in accordance with an evaporator load allows the pressure (the medium pressure) used in the evaporator to be determined based on a relative ratio between the throttle setting values of the respective valves, offering an advantage in that a suitable control without hunting can be carried out.

A preferred embodiment of the present invention will be described with reference to the drawings.

Figure 1:
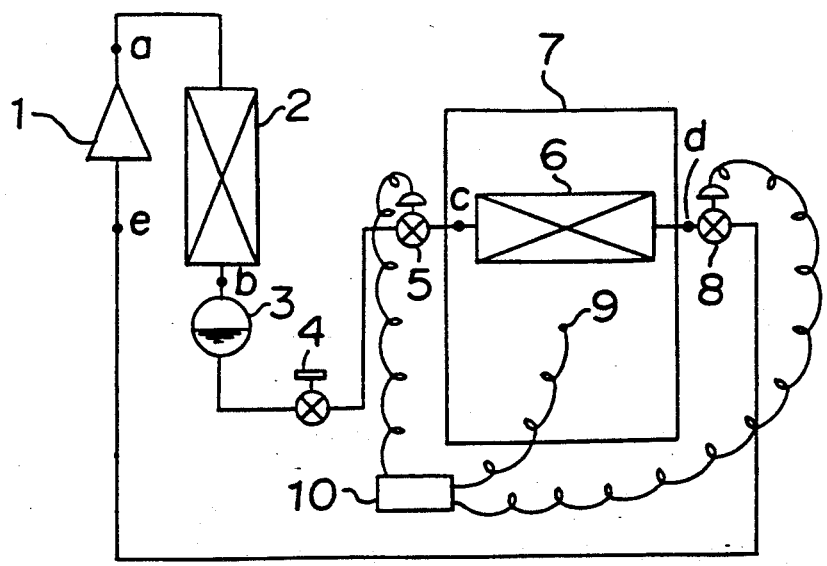
FIG. 1 is a schematic diagram showing the refrigeration cycle system according to an embodiment of the present invention.

In FIG. 1, reference numeral 1 designates a compressor which has constant revolution. Reference numeral 2 designates a condenser. Reference numeral 3 designates a reservoir. Reference numeral 4 designates a solenoid valve. Reference numeral 5 designates an electric expansion valve. Reference numeral 6 designates an evaporator. Reference numeral 7 designates a refrigerator. Reference numeral 8 designates a motorized suction throttle valve. Reference numeral 9 designates a temperature sensor in the refrigerator. Reference numeral 10 designates a control unit. The compressor 1, the condenser 2, the reservoir 3, the solenoid valve 4, the electric expansion valve 5, the evaporator 6, and the motorized suction throttle valve constitute a refrigeration cycle.

Figure 2:
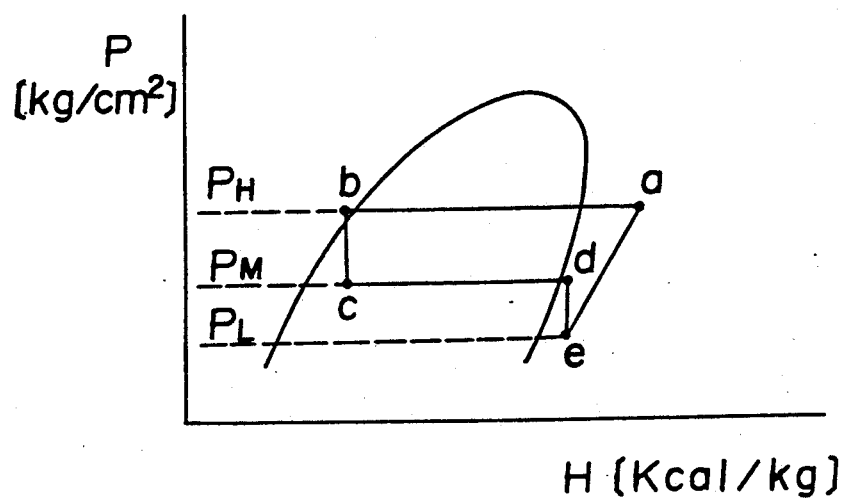
FIG. 2 is a Mollier diagram of a refrigerant according to the embodiment.
Figure 3:
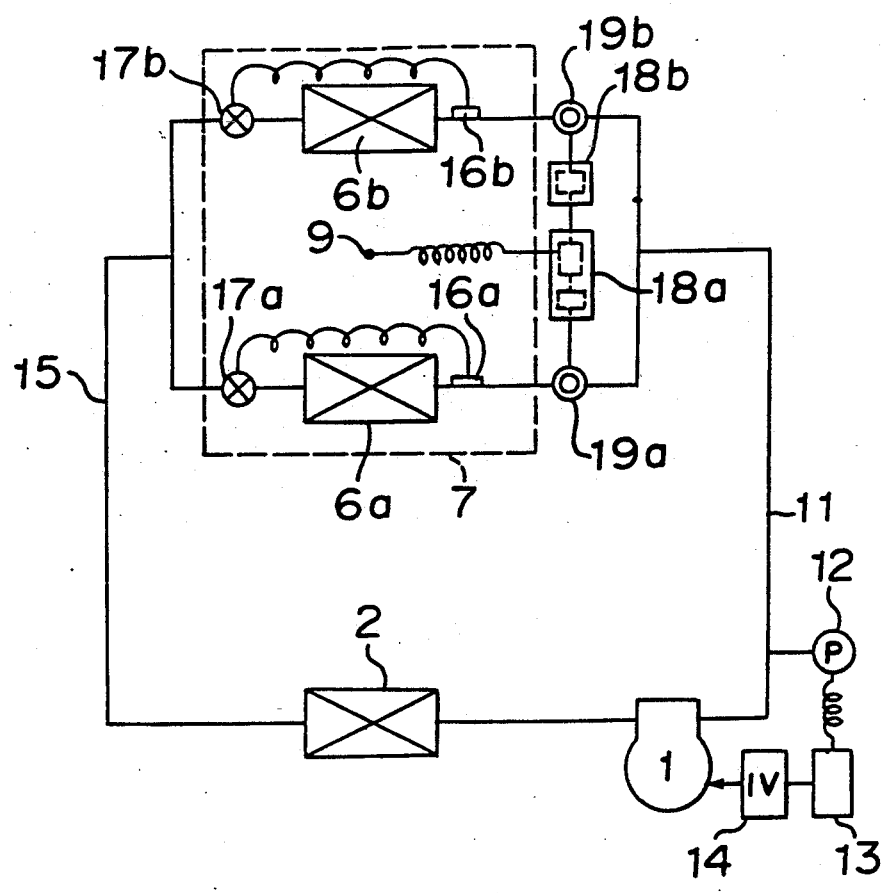
FIG. 3 is a schematic diagram showing a conventional refrigeration cycle system.

Referring now to FIG. 2, there is shown a Mollier diagram of a refrigerant in the refrigeration cycle system according to the embodiment, wherein operating points in the refrigeration are shown. Points a-e in FIG. 1 and those in FIG. 2 correspond to each other, respectively to show the same operating points. A gaseous refrigerant at the point a which has been discharged from the compressor 1 and which has a high temperature and a high pressure ($P_H$) enters the condenser 2 to be condensed and liquefied under a high pressure, and arrives at the point b. The refrigerant so liquefied passes through the reservoir 3, and passes through the solenoid valve 4 which is opened. Then, the refrigerant is depressurized to a medium pressure $B_M$ by the electric expansion valve 5 to become a two phase refrigerant at the point c. The refrigerant is evaporated in the evaporator 6 to become an evaporated gaseous refrigerant at the point d. The refrigerant is depressurized to a low pressure $P_L$ by the motorized suction throttle valve 8, and reaches the point e. Then, the refrigerant is taken into the compressor 1.

A discharge $G_{comp}$ [Kg/h] of the refrigerant from the compressor 1 is shown by the equation (1):

$$G_{comp} = V_p \cdot \frac{1}{V_e} \cdot \eta v \quad (1)$$

$V_p$: Theoretical piston displacement [m³/h]
$V_e$: Suction gas specific volume [m³/kg]
$\eta v$: Volumetric efficiency Because $V_p$ (theoretical piston displacement in the equation (1)) is constant in the compressor 1 with constant revolution, a capacity control is carried out based on the suction gas specific volume $V_e$, i.e. the capacity control is determined by a value indicative of the low pressure $P_L$.

On the other hand, a throttle side has a two step structure. The throttle setting $S_{LEC}$ [m²] of the electric expansion valve 5 as the first step throttle is shown by the equation (2):

$$G_{comp} \approx S_{LEV} \cdot C_D \cdot \sqrt{P_H - P_M} \quad (2)$$

The throttle Setting $S_{Suc}$ [m²] of the motorized suction throttle valve 8 as the second step throttle is shown by the equation (3):

$$G_{comp} \approx S_{Suc} \cdot C_D \cdot \sqrt{P_M - P_L} \quad (3)$$

From the equation (2) and the equation (3) is obtained the following equation:

$$S_{LEV} \cdot S_{Suc} = \sqrt{P_M - P_L} : \sqrt{P_H - P_M} \quad (4)$$

The equation (4) indicates that a ratio of the throttle setting $S_{LEV}$ [m²] of the electric expansion valve 5 to the throttle Setting $S_{Suc}$ [m²] of the motorized suction throttle valve 8 is nearly inversely proportional to a ratio of the pressure drop between the high pressure $P_H$ and the medium pressure $P_M$ and that between the medium pressure $P_M$ and the low pressure $P_L$.

It means that in order to raise the medium pressure $P_M$ as the evaporation pressure, the throttle setting $S_{SEV}$ of the electric expansion valve 5 is opened and the valve setting $S_{Suc}$ of the motorized suction throttle valve 8 is throttled, and that to lower the medium pressure $P_M$, the throttle setting $S_{LEV}$ of the electric expansion valve 5 is throttled and the valve setting $S_{Suc}$ of the motorized suction throttle valve 8 is opened.

When the evaporation load is great, the variable $\Delta S_{LEV}$ of the throttle setting $S_{LEV}$ of the electric expansion valve 5 is set to be in a throttle direction $\Delta S_{LEV} < 0$, and the variable $S_{Suc}$ of the throttle setting $S_{Suc}$ of the motorized suction throttle valve 8 is set to be in an unthrottling direction $\Delta S_{suc} \geq 0$ in association with the operation of the electric expansion valve. Conversely, when the evaporation load is small, the variable of the throttle setting of the electric expansion valve is set to be in an unthrottling direction $\Delta S_{LEV} > 0$, and the variable of the throttle setting of the motorized suction throttle valve is set to be in a throttling direction $\Delta S_{Suc} \leq 0$ in association with the operation of the electric expansion valve.

For example, when a detected temperature $T_R$ in the refrigerator is higher than a set value $T_R^*$, it is determined that the evaporation load is great. The electric expansion valve is throttled, and the motorized suction throttle valve is unthrottled. Conversely, if $T_R \leq T_R^*$, it is determined that the evaporation load is small. The electric expansion valve is unthrottled, and the motorized suction throttle valve is throttled.

As explained, when a capacity has to be increased because the evaporation load is great, the throttle setting of the electric expansion valve is set to be in a throttle direction, and the throttle setting of the motorized suction valve is set to be in an unthrottling direction in association with the operation of the electric expansion valve. Conversely, when a capacity has to be decreased because the evaporation load is small, the throttle setting of the electric expansion valve is set to be in an unthrottling direction, and the throttle setting of the motorized suction valve is set to be in a throttle direction in association with the operation of the electric expansion valve. Such an arrangement can realize a capacity control which is free from hunting.

We claim:
1. A refrigeration cycle system comprising:
   a refrigeration cycle having a compressor (1), a condenser (2), a solenoid valve (4), an electronic expansion valve (5), an evaporator (6), and a motorized suction throttle valve (8) connected in series therein; and
   a control unit (10) which when an evaporation load is great, a variable ($\Delta S_{LEV}$) of the setting ($S_{LEV}$) of the electronic expansion valve (5) is set to be in a throttling direction and a variable ($\Delta S_{Suc}$) of the setting ($\Delta S_{Suc}$) of the motorized suction throttle valve (8) is set to be an unthrottling direction in association with the operation of the electronic expansion valve (5), and which the evaporation load is small, the variable ($\Delta S_{LEV}$) of the setting of the electronic expansion valve (5) is set to be in an unthrottling direction and the variable ($\Delta S_{Suc}$) of the setting of the motorized suction throttle valve (8) is set to be in a throttling direction in association with the operation of the electronic expansion valve (5).

* * * * *